(12) United States Patent
Pollock et al.

(10) Patent No.: US 11,725,263 B2
(45) Date of Patent: Aug. 15, 2023

(54) HIGH TEMPERATURE OXIDATION RESISTANT CO-BASED GAMMA/GAMMA PRIME ALLOYS DMREF-CO

(71) Applicant: The Regents of the University of California, Oakland, CA (US)

(72) Inventors: Tresa M. Pollock, Santa Barbara, CA (US); Colin A. Stewart, Goleta, CA (US); Sean P. Murray, Goleta, CA (US); Carlos G. Levi, Santa Barbara, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 363 days.

(21) Appl. No.: 16/375,687

(22) Filed: Apr. 4, 2019

(65) Prior Publication Data

US 2020/0140978 A1    May 7, 2020

Related U.S. Application Data

(60) Provisional application No. 62/652,614, filed on Apr. 4, 2018.

(51) Int. Cl.
  *C22C 30/00* (2006.01)
  *C22F 1/10* (2006.01)
  (Continued)

(52) U.S. Cl.
  CPC ............... *C22C 30/00* (2013.01); *C22F 1/10* (2013.01); *F01D 5/28* (2013.01); *B33Y 70/00* (2014.12);
  (Continued)

(58) Field of Classification Search
  CPC ......... B33Y 70/00; C22C 19/07; C22C 30/00; C22F 1/10
  See application file for complete search history.

(56) References Cited

U.S. PATENT DOCUMENTS 3,667,939 A   6/1972 Hecht
4,078,922 A   3/1978 Magyar et al.
(Continued)

FOREIGN PATENT DOCUMENTS

EP   0588657    3/1994
EP   2532761    12/2012
(Continued)

OTHER PUBLICATIONS

PCT International Search Report & Written Opinion dated Jun. 24, 2019 for PCT Application No. PCT/US19/25882.
(Continued)

*Primary Examiner* — Nicholas A Wang
(74) *Attorney, Agent, or Firm* — Gates & Cooper LLP

(57) ABSTRACT

A series of alloys of Co, Ni, Al, W, Ta, and Cr, wherein the alloy comprises a solid solution of gamma and gamma prime alloy phases, the Ni content is greater than 25% at. %, the Al content is greater than 10 at. %, the Cr content is greater than 2 at. %, and the Ni:Co ratio is between 0.5 and 1.5. In one or more examples, the alloy further comprises one or more of C, B, and a reactive element metal. Embodiments of the alloy simultaneously possess a high solvus temperature, a high fraction of the strengthening $\gamma'$-$L1_2$ phase, good oxidation resistance and highly favorable solidification characteristics.

31 Claims, 7 Drawing Sheets

(51) Int. Cl.
  *F01D 5/28* (2006.01)
  *B33Y 70/00* (2020.01)
  *B33Y 80/00* (2015.01)

(52) U.S. Cl.
  CPC ........... *B33Y 80/00* (2014.12); *F05D 2220/32* (2013.01); *F05D 2300/175* (2013.01)

(56) References Cited

U.S. PATENT DOCUMENTS

| | | | |
|---|---|---|---|
| 4,388,124 A | 6/1983 | Henry | |
| 4,437,913 A | 3/1984 | Fukui et al. | |
| 4,668,265 A | 5/1987 | Gaul et al. | |
| 4,738,389 A | 4/1988 | Moshier et al. | |
| 4,789,412 A | 12/1988 | Nakamura et al. | |
| 5,270,123 A | 12/1993 | Walston et al. | |
| 5,366,695 A | 11/1994 | Erickson | |
| 5,395,584 A | 3/1995 | Berger et al. | |
| 5,455,120 A | 10/1995 | Walston et al. | |
| 5,916,382 A | 6/1999 | Sato et al. | |
| 8,551,265 B2* | 10/2013 | Ishida | C22F 1/10 148/674 |
| 9,034,247 B2 | 5/2015 | Suzuki et al. | |
| 9,543,274 B2 | 1/2017 | Groothuis et al. | |
| 10,094,004 B2* | 10/2018 | Hardy | C22C 1/0433 |
| 2011/0062214 A1* | 3/2011 | Park | C22F 1/10 228/2.1 |
| 2011/0268989 A1* | 11/2011 | Suzuki | C22F 1/00 428/668 |
| 2012/0312426 A1* | 12/2012 | Suzuki | C23C 8/10 148/284 |
| 2012/0312434 A1* | 12/2012 | Suzuki | C22F 1/10 148/707 |
| 2013/0240607 A1 | 9/2013 | Park et al. | |
| 2016/0053346 A1* | 2/2016 | Szuromi | B22F 1/16 75/331 |
| 2016/0168662 A1 | 6/2016 | Hardy et al. | |
| 2016/0348216 A1 | 12/2016 | Szuromi et al. | |
| 2017/0095858 A1* | 4/2017 | Stankowski | B22F 1/0003 |
| 2017/0209923 A1* | 7/2017 | Giovannetti | B23K 26/0006 |
| 2017/0306460 A1 | 10/2017 | Lin et al. | |
| 2017/0342527 A1 | 11/2017 | Goeken et al. | |
| 2018/0305792 A1* | 10/2018 | Forsik | C22C 19/056 |

FOREIGN PATENT DOCUMENTS

| | | |
|---|---|---|
| EP | 2532762 | 12/2012 |
| EP | 2298486 | 10/2013 |
| EP | 3031938 | 6/2016 |

OTHER PUBLICATIONS

Nang, B., et al., "The A1 to L10 transformation in FePt films with ternary alloying additions of Mg, V, Mn, and B", Journal of Applied Physics, 2011, pp. 07B739-1-07B739-3, vol. 109.

Kawagishi, K., et al., "Development of an Oxidation-Resistant High-Strength Sixthgeneration Single-Crystal Superalloy TMS-238", Superalloys 2012, 12th International Symposium on Superalloys, pp. 189-195.

Mottura, A., et al., "Alloying Effects in The γ' Phase of Co-Based Superalloys", Superalloys 2012, 12th International Symposium on Superalloys, pp. 685-693.

Rhein, R.K., et al., "Creep Behavior of Quinary γ'-Strengthened Co-Based Superalloys", Metallurgical and Materials Transactions A, Sep. 2018, pp. 4090-4098, vol. 49A.

Chauvet, E., et al., "Hot cracking mechanism affecting a non-weldable Ni-based superalloy produced by selective electron Beam Melting", Acta Materialia, 2018, pp. 82-94, vol. 142.

David, S.A., et al., "Welding of Nickel Base Superalloy Single Crystals", Science and Technology of Welding and Joining, Apr. 1997, pp. 1-12, vol. 2 No. 2.

Stewart, C.A., et al., "Oxide Scale Formation in Novel γ-γ' Cobalt-Based Alloys", Superalloys 2016, 13th International Symposium on Superalloys, pp. 991-999.

Stewart, C.A., et al., "Rapid Assessment of Oxidation Behavior in Co-Based γ/γ' Alloys", Oxid Met, 2018, pp. 485-498, vol. 90.

Tolpygo, V.K., et al., "Microstructural study of the theta-alpha transformation in alumina scales formed on nickel-aluminides", Materials at High Temperatures, 2000, pp. 59-70, vol. 17, No. 1.

Sato, J., et al., "Cobalt-Base High-Temperature Alloys", Science, Apr. 2006, pp. 90-91, vol. 312.

Yan, H.-Y, et al., "Effect of alloying on the oxidation behaviour of Co—Al—W superalloys", Corrosion Science, 2014, pp. 382-395, vol. 83.

Titus, M.S., et al., "High Temperature Creep of New L12-containing Cobalt-base Superalloys", Superalloys 2012, 12th International Symposium on Superalloys, pp. 823-832.

Shinagawa, K., et al., "Phase Equilibria and Microstructure on γ' Phase in Co—Ni—Al—W System", Materials Transactions, 2008, pp. 1474-1479, vol. 49, No. 6.

Pollock, T.M., et al., "Multifunctional coating interlayers for thermal-barrier systems", Mrs Bulletin, Oct. 2012, pp. 923-931, vol. 37.

Shinagawa, K., et al., "Ductility enhancement by boron addition in Co—Al—W high-temperature alloys", Scripta Materialia, 2009, pp. 612-615, vol. 61.

Wang, L., "Effect of minor carbon additions on the high-temperature creep behavior of a single-crystal nickel-based superalloy", Materials Characterization, 2015, pp. 81-85, vol. 104.

Klein, L., et al., "High temperature oxidation of γ/γ'-strengthened Co-base superalloys", Corrosion Science, 2011, pp. 2027-2034, vol. 53.

Naumenko, D., et al., "Current Thoughts on Reactive Element Effects in Alumina-Forming Systems: In Memory of John Stringer", Oxid Met, 2016, pp. 1-43, vol. 86.

Adharapurapu, R.R., et al., "A combinatorial investigation of palladium and platinum additions to b-NiAl overlay coatings", Acta Materialia, 2014, pp. 379-393, vol. 77.

Tsunekane, M., et al., "Single-crystal solidification of new Co—Al—W-base alloys", Intermetallics, 2011, pp. 636-643, vol. 19.

Metting, C.J., et al., "Combinatorial Approach to Turbine Bond Coat Discovery", ACS Comb. Science, 2013, pp. 419-424, vol. 15.

Naujoks, D., et al., "Phase Formation and Oxidation Behavior at 500° C. in a Ni—Co—Al Thin-Film Materials Library", ACS Comb. Science, 2016, pp. 575-582, vol. 18.

Pint, B.A., et al., "The use of two reactive elements to optimize oxidation performance of alumina-forming alloys", Materials at High Temperatures, 2003, pp. 375-386, vol. 20, No. 3.

Pint, B.A., "Optimization of Reactive-Element Additions to Improve Oxidation Performance of Alumina-Forming Alloys", J. Am. Ceram. Soc., 2003, pp. 886-895, vol. 86, No. 4.

Extended European Search Report dated Dec. 2, 2021 for European Patent Application No. 19782431.1.

Stewart, C.A., "Accelerated Design and Characterization of Oxidation Resistant Co-Based Gamma / Gamma-Prime Superalloys", University of California Santa Barbara, Mar. 2019, pp. 1-225.

Suzuki, A., et al., "L12-Strengthened Cobalt-Base Superalloys", Annual Review of Materials Research, Jul. 2015, pp. 345-368, vol. 45.

Revilla-Leon, M., et al., "Additive Manufacturing Technologies Used for 3D Metal Printing in Dentistry", Curr Oral Health Rep, 2017, pp. 201-208, vol. 4.

Stewart, C.A., et al., "Accelerated discovery of oxidation resistant CoNi-base γ/γ' alloys with high L12 solvus and low density", Material and Design, 2020, pp. 1-12, vol. 189.

* cited by examiner

HIGH TEMPERATURE OXIDATION RESISTANT CO-BASED GAMMA/GAMMA PRIME ALLOYS DMREF-CO

CROSS REFERENCE TO RELATED APPLICATIONS

This application claims the benefit under 35 U.S.C. Section 119(e) of commonly-assigned U.S. Provisional Patent Application No. 62/652,614 filed Apr. 4, 2018, by Tresa M. Pollock, Colin A. Stewart, Sean P. Murray, and Carlos G. Levi, entitled "HIGH TEMPERATURE OXIDATION RESISTANT CO-BASED GAMMA/GAMMA PRIME ALLOY DMREF-Co," which application is incorporated by reference herein.

STATEMENT REGARDING FEDERALLY SPONSORED RESEARCH AND DEVELOPMENT

This invention was made with Government support under Grant No. 1534264 awarded by the National Science Foundation. The Government has certain rights in this invention.

BACKGROUND OF THE INVENTION

1. Field of the Invention

The present invention relates to superalloys and methods of fabricating the superalloys.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

The fuel efficiency of turbine engines increases at higher operating temperatures, requiring materials that can survive hotter conditions. Historically, engine makers have continuously pursued new alloys operable at higher temperatures. Furthermore, the US burns over $36 billion of jet fuel annually, leading to large incentives for new materials developments that can reduce fuel consumption. Alloys for turbine engines require some environmental resistance in addition to high temperature creep strength, ideally in the form of developing an aluminum oxide layer, in combination with strengthening precipitates present at high temperatures, respectively.

One or more embodiments of the materials described herein may satisfy these needs.

SUMMARY OF THE INVENTION

DMREF-Co is a series of cobalt based superalloys comprising a face-centered cubic matrix ($\gamma$) that maintain strengthening precipitates, based on the intermetallic $\gamma'$-$Co_3$(W,Al) phase, above 1100° C. (often approximately 1200° C.), and are able to generate a protective alpha-aluminum-oxide layer upon exposure to air at 1100° C. While Co alloys have been developed exhibiting both these properties individually, DMREF-Co alloys are the first to achieve both together. They also possess good solidification characteristics, enabling single crystal growth, 3D printing and casting of large ingots for wrought processing, likely improving yields over current Ni-base alloys. DMREF-Co alloys also exhibit desirable mechanical properties, including excellent high temperature creep resistance.

A composition of matter or method as disclosed herein can be embodied in many ways including, but not limited to, the following.

1. A composition of matter, comprising:
   an alloy of Co, Ni, Al, Ta, and Cr, wherein:
   the alloy comprises a solid solution of gamma (Al, face centered cubic) and gamma prime ($L1_2$ intermetallic) alloy phases,
   the Ni content is at least 25% at. %,
   the Al content is at least 10 at. %,
   the Cr content is at least 2 at. %,
   the Ni:Co ratio is between 0.5 and 1.5.

2. The composition of matter of embodiment 1, wherein:
   the Ni content is in a range of 25 at. % to 40 at. %,
   the Al content is in a range of 10 at. % to 16 at. %,
   the Cr content is in a range of 2 at. % to 8 at. %,
   the Ta content is in a range of 2-5 at. %, and
   further comprising a W content in a range of 0 to 5 at. %, with
   the Ni:Co ratio is between 0.5 and 1.5.

3. The composition of matter of embodiment 1, wherein
   the Co content is in a range of 38-40 at. %,
   the Ni content is in a range of 37-39 at. %,
   the Al content is in a range of 12-14 at. %,
   the Cr content is in a range of 5-7 at. %,
   the Ta content is in a range of 2-4 at. %, and
   the W content is in a range of 0.5-2 at. %.

4. The composition of matter of embodiment 1, 2, or 3 wherein the alloy further comprises one or more of C, B, Y and Hf.

5. The composition of matter of embodiment 1, 2, or 3 wherein the alloy further comprises one or more of C, B, and a reactive element metal.

6. The composition of matter of any of the embodiments 1-5, wherein:
   the C content is in a range of 0.05 to 0.25 at. %,
   the B content is in a range of 0.01 to 0.1 at. %,
   the Y content is in a range of 0.001 to 0.004, and
   the Hf content is in a range of 0.02 to 0.08 at. %.

7. The composition of matter of embodiments 1-5, wherein:
   the Ni content is in a range of 36-38 at. %,
   the Al content is in a range of 12-14 at. %,
   the Cr content is in a range of 5-7 at. %,
   the Ta content is in a range of 3-5 at. %,
   the W content is in a range of 0.5-2 at. %.
   the C content is in a range of 0.05-0.25 at. %,
   the B content is in a range of 0.01-0.1 at. %,
   the Y content is in a range of 0.001-0.004 at. %,
   the Hf content is in a range of 0.02-0.08 at. %,
   the Co content is the remainder, 8. The composition of matter of any of the embodiments 1-7, further comprising at least one of Ti and Nb, wherein the Ti or Nb content is up to 4 at. %.

9. The composition of matter of any of the embodiments 1-8, wherein the contents of the Ni, Co, Ni, Al, W, Ta, and Cr are such that the alloy maintains its strengthening precipitates above a temperature of 1190° C. and is able to generate a protective aluminum oxide layer upon exposure to air at 1100° C.

10. The composition of matter of any of the embodiments 1-8, wherein the contents of the Co, Ni, Al, W, Ta, and Cr are such that the alloy maintains a creep rupture strength of 248 MPa at 982° C. and 310 MPa at a temperature of 900° C.
11. A gas turbine component comprising the composition of matter of any of the embodiments 1-11.
12. A cast and wrought piece comprising the composition of matter of any of the embodiments 1-11.
13. A powder material for additive manufacturing comprising the composition of matter of any of the embodiments 1-11.
14. The present disclosure further describes a method of fabricating a composition of matter, comprising:
melting Co, Ni, Al, Ta, and Cr together so as to form an alloy;
further forming the alloy so as to form a formed alloy;
heat treating the formed alloy so as to obtain a heat treated alloy;
performing an ageing treatment of the heat treated alloy so as to obtain an aged alloy, wherein:
the aged alloy comprises a solid solution of gamma (Al, face centered cubic) and gamma prime ($L1_2$ intermetallic) alloy phases,
the Ni content is at least 25% at. %,
the Al content is at least 10 at. %,
the Cr content is at least 2 at. %,
the Ni:Co ratio is between 0.5 and 1.5.
15. The method of embodiment 14, wherein the forming forms the alloy into a powder.
16. The method of embodiment 15, further comprising processing the powder using powder metallurgy so as to obtain a part.
17. The method of embodiment 16, wherein the processing comprises additive manufacturing.
18. The method of embodiment 14, wherein the forming comprises casting the alloy so as to form a casted alloy.
19. The method of embodiment 18, further comprising working the casted alloy so as to form a cast and wrought piece.
20. The method of embodiment 14, wherein the forming comprises solidifying the alloy into an ingot.
21. The method of embodiment 20, wherein the forming further comprises forging the ingot, extruding the ingot, or rolling the ingot.
22. The method of embodiment 14, wherein the forming comprises growing the alloy so as to obtain a single crystal.
23. The composition of matter of any of the embodiments 1-13 manufactured using the method of any of the embodiments 14-23.

BRIEF DESCRIPTION OF THE DRAWINGS

Referring now to the drawings in which like reference numbers represent corresponding parts throughout:
FIG. 3A and FIG. 3B: Backscattered electron micrographs (BSE) of the oxide scale and underlying alloy in cross-section after 1 h exposure in air at 1100° C., wherein
FIG. 3A shows a commercial Ni-base alloy CMSX-4 [1] and FIG. 3B: shows a Co-base DMREF-Co-10 according to one or more embodiments described herein.

DETAILED DESCRIPTION OF THE INVENTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Technical Description

Example Compositions and Properties

Figure 1:
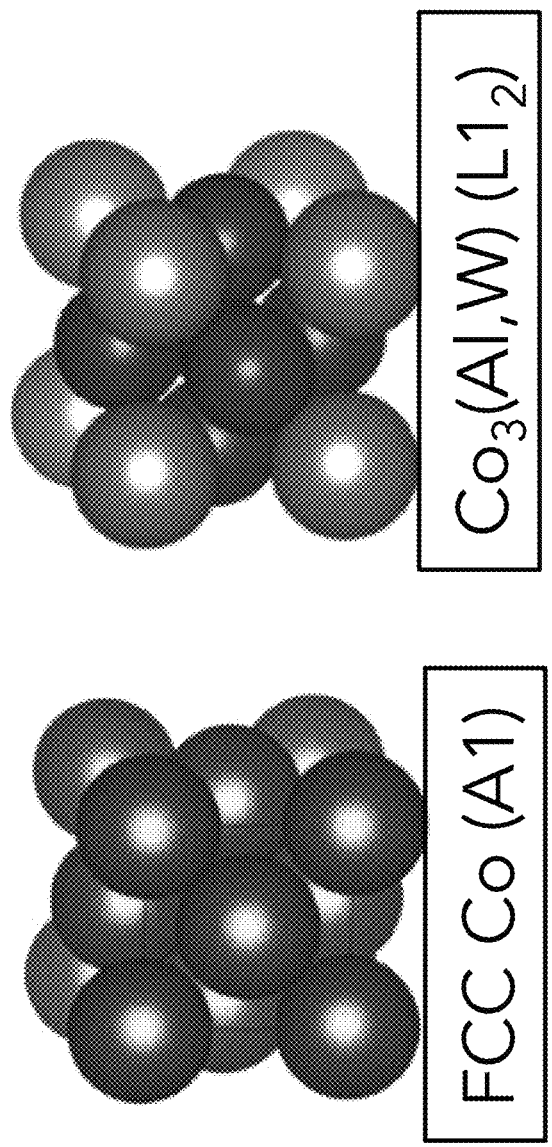
FIG. 1:—The crystal structure of the fcc Co matrix and the order $L1_2$ precipitates in the DMREF alloy series according to one or more embodiments described herein.
Figure 2:
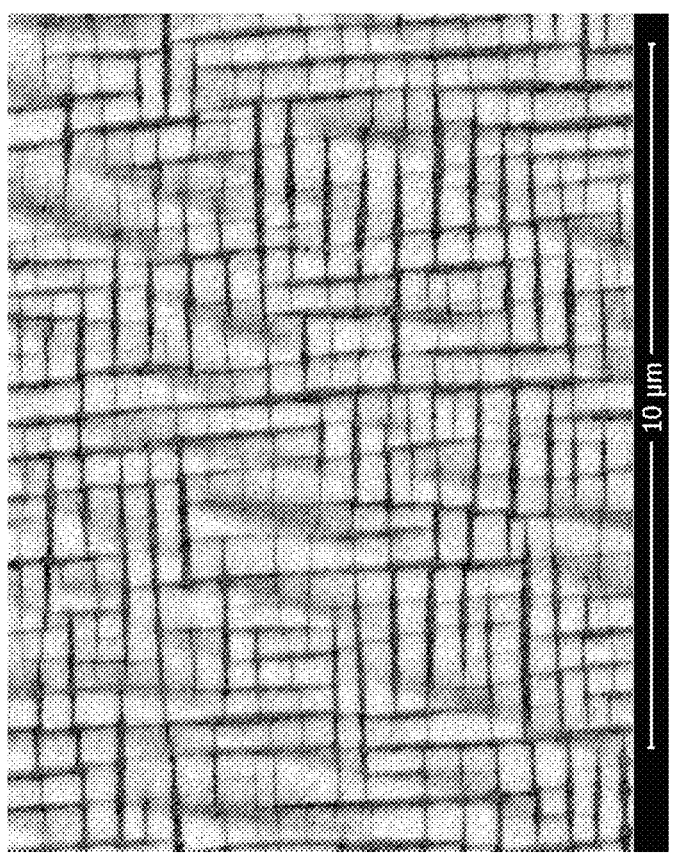
FIG. 2: Cuboidal γ/γ' microstructure of DMREF-Co-10 after heat treatment, prior to oxidation, according to one or more embodiments described herein. The γ' phase is shown in lighter grey, within dark grey γ channels.
Figures 3A, 3B:
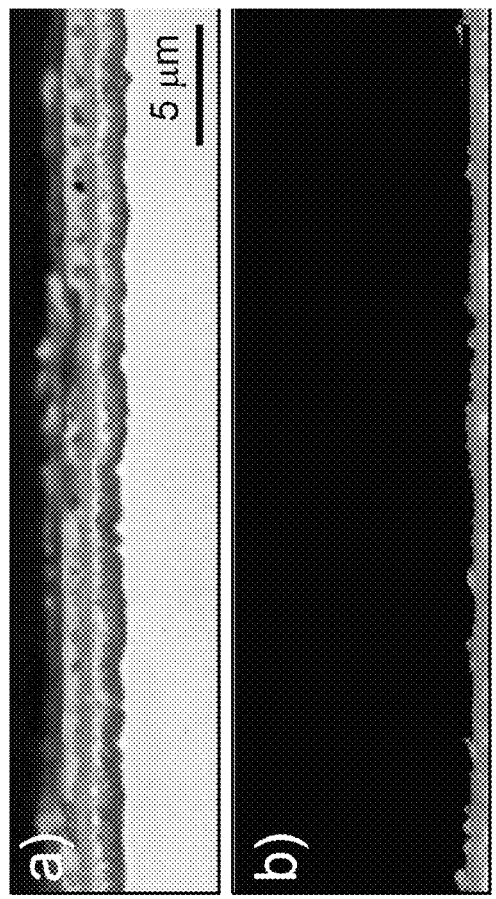
Figure 4:
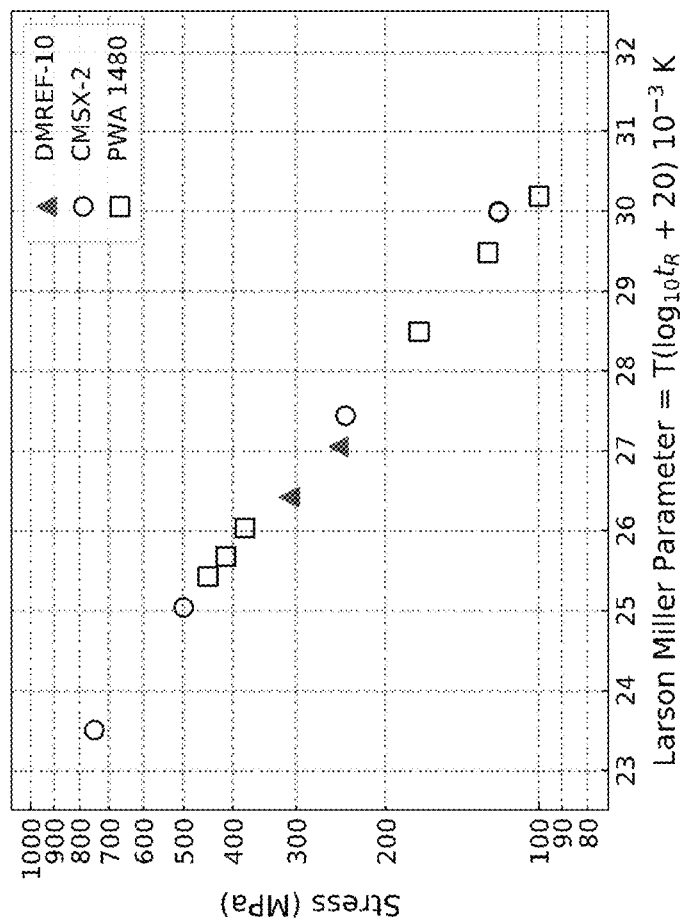
FIG. 4. High temperature tensile creep strength of DMREF-10 alloy (according to one or more embodiments described herein) in comparison to first generation nickel-base alloys CMSX-2 and PWA1480. The Larson Miller parameter is a combined temperature (T) and time to rupture ($t_R$) parameter.

DMREF-Co is a series of cobalt-based superalloys with nominal compositions shown in Table 1. After suitable heat treatment (described below), DMREF-Co comprises or consists of the solid solution γ (Al) and ordered γ' ($L1_2$) alloy phases (FIG. 1). This microstructure is shown in FIG. 2, with the γ' phase precipitates exhibiting a cuboidal morphology dispersed in the γ matrix, similar to that of commercial Ni-base superalloys. The phase-fraction of the γ' phase is in excess of 60%. The densities of DMREF-Co alloys (e.g. 8.65 g/cm$^3$ for DMREF-Co-10 at ambient temperature), are generally similar to that of commercial Ni-base alloys such as CMSX-4 (8.70 g/cm$^3$). Upon exposure to air at 1100° C. for 1 h, DMREF-Co alloys form a continuous scale of protective α-$Al_2O_3$(FIG. 3B). Some compositions such as DMREF-Co-10 do so with small amounts of overlying oxides such as spinel $(Co,Ni)(Al,Cr)_2O_4$ and $(Co,Ni)Ta_2O_6$. Tensile creep testing of DMREF-Co-10 in single crystal form (FIG. 4) shows that these alloys sustain high stresses at elevated temperature, at a level equivalent to first generation nickel-base single crystal alloys. This high temperature strength was arrived at by maximizing the superlattice intrinsic stacking fault energy, which was theoretically calculated [2 and 3]. This class of Co-base alloys is relatively new and, to this point in time, no alloys have been identified that simultaneously possess such high temperature strength along with an ability to form a protective alumina scale. Additionally, the solidification behavior of this alloy class makes it interesting as a material for additive manufacturing, for physically large single crystal cast turbine components and/or for polycrystalline turbine disk, combustor liner and fuel nozzle applications [4].

the desired γ/γ' phase field (that is, having no additional alloy phases present, as such would be undesirable for the alloy mechanical properties). This resultant composition space, with desirable oxidation behavior co-existing with the γ/γ'

TABLE 1

Nominal Compositions and Select Thermophysical Properties of DMREF-Co Alloys

| Alloy | Description | γ' Solvus | Solidus | Fundamental Elements (atomic %) | | | | | | Suggested Additional Variants (at. %) | | |
|---|---|---|---|---|---|---|---|---|---|---|---|---|
| | | | | Co | Ni | Al | W | Ta | Cr | Grain Boundary Strengthener | RE Addition | Higher Order |
| DMREF-Co Series | General Range of Compositions | >1100° C. | — | bal. | 25-40 | 10-16 | 0-5 | 2-5 | 2-8 | C, B | Hf, Y, La, Zr, Sc, etc. | Ti, Nb |
| DMREF-Co-0 | Proof of Concept | >1100° C. | — | bal. | 32 | 12 | 4 | 2 | 3 | — | — | — |
| DMREF-Co-8 | Improved γ' Solvus | 1226° C. | 1324° C. | bal. | 35 | 14 | 4 | 4 | 3 | — | — | — |
| DMREF-Co-9 | Improved Oxidation | 1195° C. | 1328° C. | bal. | 35 | 14 | 1 | 3 | 6 | — | — | — |
| DMREF-Co-10 | Balanced γ' Solvus & Oxidation | 1200° C. | 1343° C. | bal. | 38 | 13 | 1 | 3 | 6 | — | — | — |
| DMREF-Co-10+ | Further Additives | 1204° C. | 1329° C. | bal. | 37 | 13 | 1 | 4 | 6 | 0.06 C + 0.08 B | 0.004 Y + 0.026 Hf | — |

Example Synthesis and Application

Figure 5A:
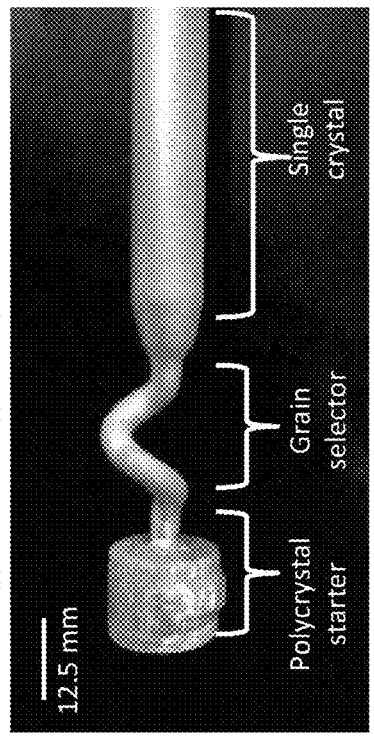
FIG. 5A and FIG. 5B. A single crystal of DMREF 10 according to one or more embodiments described herein grown by the Bridgman process (FIG. 5A) and a cross section through a single pass electron beam line scan (FIG. 5B) showing the melted region without any cracks, including along the grain boundary as it passes into the melted zone.
Figure 5B:
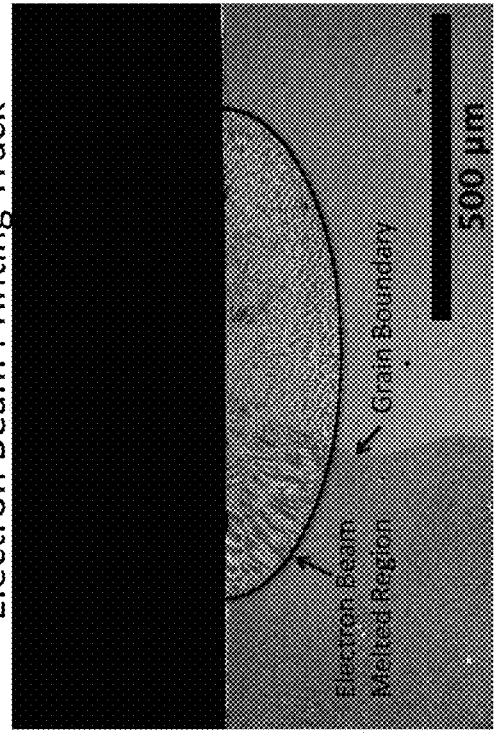

DMREF-Co alloys are made by vacuum induction melting a composition given in Table 1 using high-purity stock materials such that a low-sulfur content is achieved (<5 parts per million by weight, ppmw). The material is then cast, wrought or gas atomized and 3D printed into the desired form and heat treated with a homogenizing solution treatment (e.g., 12 hours at 1245° C.), followed by an ageing treatment to precipitate the strengthening γ' phase (e.g., 50 hours at 1000° C.). Polycrystalline parts may be suitable for turbine components such as vanes, disks, and combustor liners. Single crystals of DMREF-Co suitable for turbine blades may be cast using a conventional or high gradient Bridgman furnace. The alloy solidification characteristics make DMREF-Co ideal for the growth of physically large single crystals free of freckle-type defects and also as a crack-resistant alloy for laser-based or electron beam-based additive manufacturing components. FIG. 5A shows an example of a single crystal of alloy DMREF-10 grown by the Bridgman method and an electron beam melted track of DMREF-10 (FIG. 5B), sectioned to demonstrate that there is no cracking as a result of the melting. This is unexpected, as nickel alloys with high volume fractions of strengthening precipitates are well known to crack under these conditions [5, 6]. The large temperature range between the γ' solvus and the solidus, Table 1, enables processing along wrought paths (forging, rolling, extrusion).

Example Functioning and Design

Figure 6:
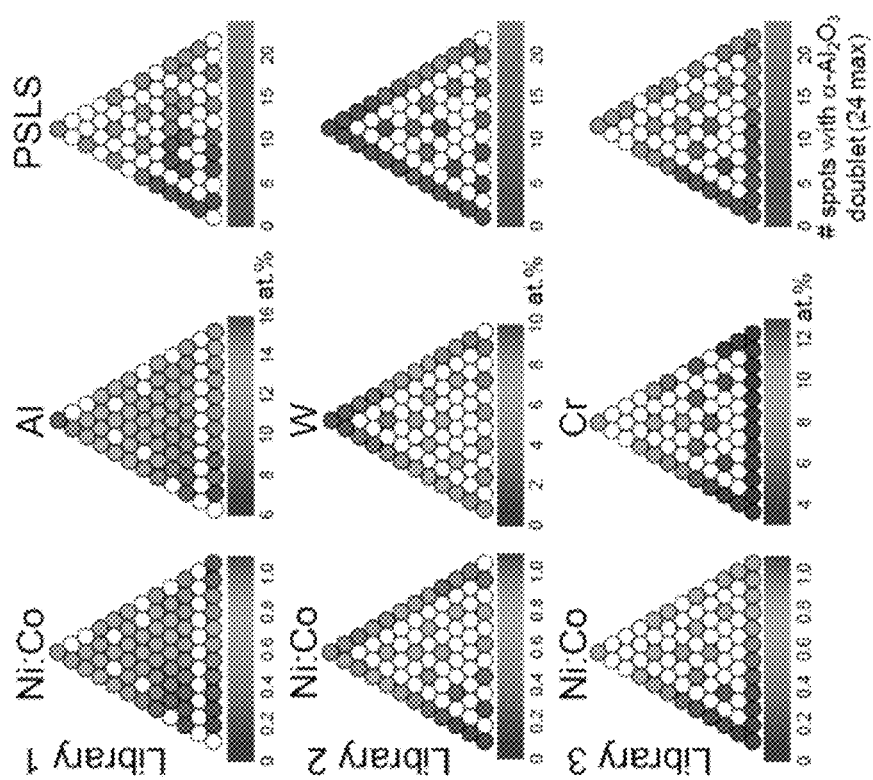
FIG. 6. Combinatorial libraries of alloys containing Co, Ni, Al, W, Cr and Ta according to one or more embodiments described herein. Each circle represents an individual sample, with a total of 234 samples. In all 3 libraries, Ta is held constant at 1.5 at %. Library 1 holds W and Cr constant and varies the Al and Ni:Co ratio. Library 2 holds Al and Cr constant and varies W and Ni:Co ratio. Library 3 holds Al and W constant and varies Cr and Ni:Co ratio. High throughput screening is conducted by photostimulated luminescence spectroscopy (PSLS). Green indicates alumina formation in all regions of the surface screened, with 24 points per sample screened.

The DMREF-Co series was designed using prior knowledge from high-throughput combinatorial experiments and first principles phase stability calculations [7-8]. FIG. 6 shows three combinatorial libraries that guided the development of the DMREF alloys. Test alloy compositions were screened for desirable oxidation behavior using a rapid, non-destructive technique called Photostimulated Luminescence Spectroscopy (PSLS) [9]. Ideal oxidation behavior is nominally the formation of a continuous α-Al$_2$O$_3$ layer, with minimal amounts of overlying extraneous oxide, for a total scale thickness comparable to Ni-base superalloys CMSX-4 or René N5 under the same conditions (FIG. 2). Candidate alloy compositions were identified that displayed promising oxidation behavior combined with microstructures within the desired γ/γ' phase field (that is, having no additional alloy phases present, as such would be undesirable for the alloy mechanical properties). This resultant composition space, with desirable oxidation behavior co-existing with the γ/γ' alloy phases, was then optimized for thinner oxide scale-forming behavior and higher γ' solvus temperature. The functions of the different alloying additions are listed below:

- Co—W—Al forms the basis of the γ/γ' structure, as originally discovered in 2006 by Sato et al. [10]. This ternary system is observed to have a higher solidus temperature than Ni-base systems, allowing for potential optimization beyond the temperature capability of Ni alloys. Alone, however, the Co—W—Al ternary does not have a very high γ' solvus temperature, nor desirable oxidation behavior.

- The W content of DMREF-Co was adjusted to stay within the anticipated γ/γ' phase field so that other alloy phases beyond γ and γ' are discouraged from precipitating in the temperature range of interest. Previously it has been shown that 7.5 at % W is needed to make the γ' precipitate phase stable [10]. Unexpectedly we found that W contents much lower than this are possible, e.g. DMREF-10 which contains only 1.0 at % W. Decreasing the W content also lowers the density of the alloy, which is highly desirable for potential use in aerospace applications. However, a minimum W content is desirable because it has been found to benefit oxidation behavior based on work described in [7-8].

- Al content benefits the formation of protective α-Al$_2$O$_3$; combinatorial experiments (FIG. 6) suggest that an Al content greater than ~11 at. % leads to more desirable oxidation behavior.

- Ni is added for its known ability to expand the γ/γ' phase field, increase the γ' solvus temperature, and increase the solubility of alloying additions. Work performed at UCSB suggests a more desirable oxidation behavior when Ni contents exceed ~25 at. %. For many DMREF-Co alloys, this concentration was increased to over 35 at. %.

- Cr is known to have a very beneficial effect on oxidation resistance in Al$_2$O$_3$ forming alloys, effectively reducing the Al content needed to achieve similar Al$_2$O$_3$ scales [11]. However, Cr is also known to destabilize the γ' phase, depressing the solvus temperature [12]. Combinatorial experiments show that a Cr content of ~6 at. % would yield a desirable balance of oxidation behavior, without destabilizing the γ' solvus too drastically. Thus, DMREF-Co-10 is likely a preferred composition within the range of DMREF-Co (Table 1).

Ta is added for its ability to increase the stability of the γ' phase and increase the superlattice intrinsic stacking fault energy [2-3]. The specified Ta content in the DMREF-Co series was determined by first principles calculations and experimentation at UCSB. It is inferred from work [2, 13] that a combination of the Ta and Ni contents allow DMREF-Co alloys to maintain a large γ' fraction at temperatures over 1000° C., and offset the destabilizing effect of the necessary Cr content.

A high-throughput combinatorial experimental approach for coatings [14, 15] adapted to investigate bulk alloy compositions in the Co—Ni—W—Al—Cr—Ta space had a strong influence in guiding the DMREF-Co composition ranges. Based on this work, it is anticipated that the Co—Ni—W—Al—Cr—Ta content in alloy DMREF-Co-10 provides a desirable balance of properties, and that the concentration of these six elements is unlikely to change drastically with further optimization. Yet many commercial Ni-base superalloys are more chemically complex, so there is arguably potential for further optimization of the properties of DMREF-Co through further development. Additional variants investigated include:

Minor C and B additions act as grain-boundary strengtheners [16, 17], improving the creep properties of polycrystalline components made of such an alloy (e.g. DMREF-Co-10+).

B additions have also been observed to increase oxidation resistance [18], potentially improving $Al_2O_3$ scale adherence.

Y and Hf additions, known to produce the beneficial Reactive Element (RE) effect of improving the oxidation behavior of alumina-forming alloys. RE additions have been proposed to decrease the interfacial energy between the oxide and alloy substrate, promoting $Al_2O_3$ adherence [19]. It has been shown that co-doping with multiple RE elements has a synergistic effect [20]. Conversely, it has also been demonstrated that too high of an RE content is deleterious, and the formation of RE oxides upon exposure to high temperatures should be avoided by tailoring the RE content of the alloy [21].

With respect to the RE additions, there are a wide range of potential elements to be used in place of/in addition to Y and Hf, and the RE content has not been optimized in the current DMREF-Co series, including DMREF-Co-10+. Additional elements investigated by one or more of the inventors at UCSB within the alloy class include Ti and Nb for improved high temperature strength [3].

Process Steps

Figure 7:
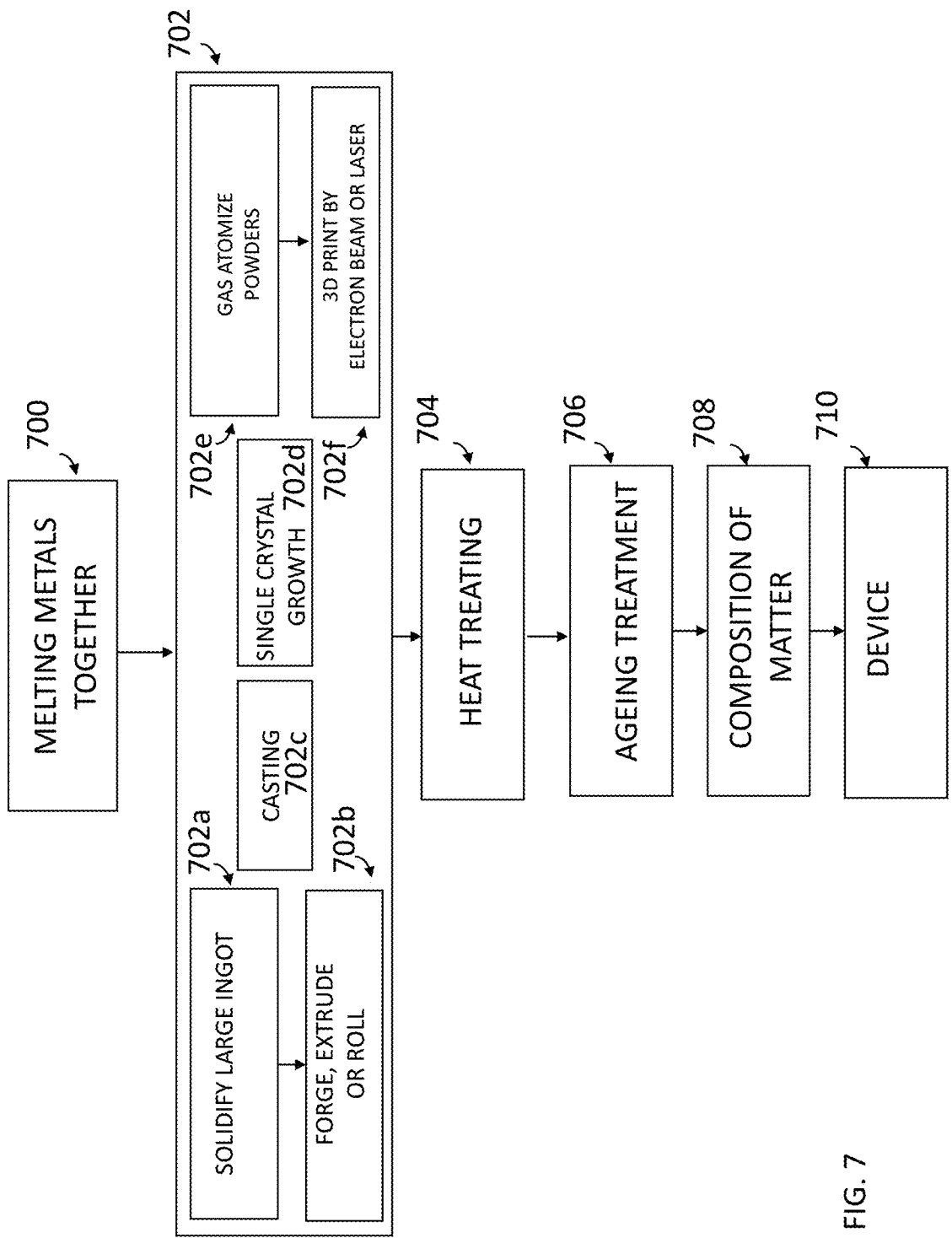
FIG. 7: Flowchart illustrating a method of fabricating a composition of matter according to one or more examples.

FIG. 7 is a flowchart illustrating a method of fabricating a composition of matter.

Block 700 represents melting high purity cobalt (Co), nickel (Ni), aluminum (Al), optionally tungsten (W), tantalum (Ta), and chromium (Cr) together so as to form an alloy, e.g., having a sulfur content lower than 5 parts per million by weight.

Block 702 represents further forming the alloy so as to form a formed alloy. The forming can be performed using a variety of methods. Blocks 702a and 702b represent an example of forming the alloy by a wrought processing path, comprising solidifying a (e.g., large) ingot (Block 702a) and forging, extruding, or rolling the ingot (Block 702b). Block 702c represents an example comprising forming the alloy by a conventional casting process. Block 702d represents forming the alloy using a single crystal growth process. Blocks 702e and 702f represent forming the alloy by gas atomization to produce powder (Block 702e) and subsequent 3D printing by either electron beam or laser-based methods (Block 702f).

Block 704 represents heat treating the formed alloy formed in Block 702. In one or more examples, the step comprises heat treating the formed alloy with a homogenizing solution for up to 10 hours at a temperature of at least 1200° C., so as to form a heat treated alloy (e.g., comprising a solutionized alloy).

Block 706 represents performing an ageing treatment of the heat treated alloy. In one or more examples, the step comprises performing the ageing treatment at a temperature of at least 1000° C. for up to 50 hours.

Block 708 represents the composition of matter fabricated using the steps of Blocks 500-506, an alloy of Co, Ni, Al, optionally W, Ta, and Cr including a solid solution of gamma (Al, face centered cubic) and gamma prime ($L1_2$ intermetallic) alloy phases, wherein the Ni content is greater than/at least 25% at. %, the Al content is greater than/at least 10 at. %, the Cr content is greater than/at least 2 at. %, and the Ni:Co ratio is between 0.5 and 1.5.

In one example, the Ni content is in a range of 25 at. % to 40 at. %, the Al content is in a range of 10 at. % to 16 at. %, the Cr content is in a range of 2 at. % to 8 at. %, the Ta content is in a range of 2-5 at. %, and the W content is in a range of 0 to 5 at. %.

In yet another example, the Co content is 39 at. %, the Ni content is 38 at. %, the Al content is 13 at. %, the Cr content is 6 at. %, the Ta content is 3 at. %, and the W content is 1 at. %.

In one or more additional examples, the alloy further comprises one or more minor amounts of carbon (C), boron (B), and a reactive element metal. For example, the alloy may further include the C content in a range of 0.05 to 0.25 at. %, the B content in a range of 0.01 to 0.1 at. %, yttrium (Y) content is in a range of 0.001 to 0.004, and hafnium (Hf) content is in a range of 0.01 to 0.2 at. %. In yet a further example, the Ni content is 37 at. %, the Al content is 13 at. %, the Cr content is 6 at. %, the Ta content is 4 at. %, the W content is 1 at. %, the C content is 0.06 at. %, the B content is 0.08 at. %, the Y content is 0.004 at. %, the Hf content is 0.02 to 0.08 at. %, and the Co content is the remainder, In one or more additional examples, the alloy further comprises titanium (Ti) and/or niobium (Nb) in amounts up to 4 at %.

In one or more examples, the contents of the Ni, Co, Ni, Al, W, Ta, and Cr are such that the alloy maintains its strengthening precipitates above a temperature of 1190° C. and is able to generate a protective aluminum oxide layer upon exposure to air at 1100° C.

In one or more further examples, the contents of the Co, Ni, Al, W, Ta, and Cr are such that the alloy maintains a creep rupture strength of 248 MPa at 982° C. and 310 MPa at a temperature of 900° C.

Block 710 represents optionally fabricating a device (e.g., a gas turbine component, a combustor liner, or a material for additive manufacturing) using the composition of matter.

Unless defined otherwise, technical and scientific terms used herein have the same meaning as is commonly understood by one of skill in the art to which this invention belongs.

In one or more examples, at. % (atomic percentage) is the percentage of one kind of atom relative to the total number of atoms in the composition of matter.

In one or more examples, the quantity or content of alloy contents is inclusive of the stated value and has the meaning dictated by one of ordinary skill in the art and context (e.g., includes the degree of error associated with measurement of the particular quantity). In one or more examples, the endpoints of all ranges directed to the same component or property are inclusive of the endpoint and a range "about" that end point. In one or more examples, the stated values of alloy content can be modified by the term "about."

EXAMPLE EMBODIMENTS

A composition of matter or method as disclosed herein can be embodied in many ways including, but not limited to, the following.

1. A composition of matter, comprising:
   an alloy of cobalt (Co), nickel (Ni), Aluminum (Al), Tantalum (Ta), and Chromium (Cr), wherein:
   the alloy comprises a solid solution of gamma (Al, face centered cubic) and gamma prime ($L1_2$ intermetallic) alloy phases, as illustrated in FIG. 1,
   the Ni content is at least 25% at. %,
   the Al content is at least 10 at. %,
   the Cr content is at least 2 at. %,
   the Ni:Co ratio is between 0.5 and 1.5.
2. The composition of matter of embodiment 1, wherein:
   the Ni content is in a range of 25 at. % to 40 at. % (e.g., 25 at. %≤Ni content≤40 at. %),
   the Al content is in a range of 10 at. % to 16 at. % (e.g., 25 at. %≤Al content≤40 at. %),
   the Cr content is in a range of 2 at. % to 8 at. % (e.g., 2 at. %≤Cr content≤8 at. %),
   the Ta content is in a range of 2-5 at. % (e.g., 2 at. %≤Ta content≤5 at. %), and
   further comprising a Tungsten (W) content in a range of 0 to 5 at. % (e.g., 0 at. %≤W content≤5 at. %).
   the Ni:Co ratio is between 0.5 and 1.5.
3. The composition of matter of embodiment 1, wherein
   the Co content is in a range of 38-40 at. % (e.g., 38 at. %≤Co content≤40 at. %),
   the Ni content is in a range of 37-39 at. % (e.g., 37 at. % Ni≤content≤39 at. %),
   the Al content is in a range of 12-14 at. % (e.g., 12 at. %≤Al content≤14 at. %),
   the Cr content is in a range of 5-7 at. % (e.g., 5 at. %≤Cr content≤7 at. %),
   the Ta content is in a range of 2-4 at. %, (e.g., 2 at. %≤Ta content≤4 at. %) and
   the W content is in a range of 0.5-2 at. % (e.g., 0.5 at. %≤W content≤2 at. %).
4. The composition of matter of embodiment 1, wherein
   the Co content is 39 at. %,
   the Ni content is 38 at. %,
   the Al content is 13 at. %,
   the Cr content is 6 at. %,
   the Ta content is 3 at. %, and
   the W content is 1 at. %.
5. The composition of matter of embodiment 1, 2, 3, or 4 wherein the alloy further comprises one or more of, or at least one atom selected from, Carbon (C), Boron (B), Yttrium (Y) and Hafnium (Hf).
6. The composition of matter of embodiment 1, 2, 3, or 4 wherein the alloy further comprises one or more of C, B, and a reactive element metal (or the alloy comprises at least one element selected from C, B, and a reactive element metal). Examples of reactive element metal include Y and Hf.
7. The composition of matter of any of the embodiments 1-6, wherein:
   the C content is in a range of 0.05 to 0.25 at. % (e.g., 0.05 at. %≤C content≤0.25 at. %),
   the B content is in a range of 0.01 to 0.1 at. % (e.g., 0.01 at. %≤B content≤0.1 at. %),
   the Y content is in a range of 0.001 to 0.004 (e.g., 0.001 at. %≤Y content≤0.004 at. %), and
   the Hf content is in a range of 0.02 to 0.08 at. % (e.g., 0.02 at. %≤Hf content≤0.08 at. %).
8. The composition of matter of any of the embodiments 1-6, wherein the C content is in a range of 0.07 to 0.1 at. %, the B content is in a range of 0.07 to 0.1 at. %, the Y content is in a range of 0.001 to 0.0025, and the Hf content is in a range of 0.01 to 0.2 at. %.
9. The composition of matter of any of the embodiments 1-6, wherein the Ni content is 37 at. %, the Al content is 13 at. %, the Cr content is 6 at. %,
   the Ta content is 4 at. %, the W content is 1 at. %, the C content is 0.06 at. %,
   the B content is 0.08 at. %, the Y content is 0.004 at. %, the Hf content is 0.026 at. %,
   and the Co content is the remainder.
10. The composition of matter of any of the embodiments 1-6, wherein:
    the Ni content is in a range of 36-38 at. % (e.g., 36 at. %≤Ni content≤38 at. %),
    the Al content is in a range of 12-14 at. % (e.g., 12 at. %≤Al content≤14 at. %),
    the Cr content is in a range of 5-7 at. % (e.g., 5 at. %≤Cr content≤7 at. %),
    the Ta content is in a range of 3-5 at. % (e.g., 3 at. %≤Ta content≤5 at. %),
    the W content is in a range of 0.5-2 at. % (e.g., 0.5 at. %≤W content≤2 at. %).
    the C content is in a range of 0.05-0.25 at. % (e.g., 0.05 at. %≤C content≤0.25 at. %),
    the B content is in a range of 0.01-0.1 at. % (e.g., 0.01 at. %≤B content≤0.1 at. %),
    the Y content is in a range of 0.001-0.004 at. % (e.g., 0.001 at. %≤Y content≤0.004 at. %),
    the Hf content is in a range of 0.02-0.08 at. % (e.g., 0.02 at. %≤Hf content≤0.08 at. %), and
    the Co content is the remainder.
11. The composition of matter of any of the embodiments 1-10, further comprising at least one of Titanium (Ti) and Niobium (Nb), wherein the Ti or Nb content is up to 4 at. % (e.g., 0 at. %≤Ti content and/or Nb content≤4 at. %).
12. The composition of matter of any of the embodiments 1-11, wherein the contents of the Ni, Co, Ni, Al, W, Ta, and Cr are such that the alloy maintains its strengthening precipitates above a temperature of 1190° C. and is able to generate a protective aluminum oxide layer upon exposure to air at 1100° C.
13. The composition of matter of any of the embodiments 1-12, wherein the contents of the Co, Ni, Al, W, Ta, and Cr are such that the alloy maintains a creep rupture strength of 248 MPa at 982° C. and 310 MPa at a temperature of 900° C., or the contents of the Co, Ni, Al, W, Ta, and Cr are such that the alloy possesses resistance to creep at 248 MPa at 982° C. and 310 MPa at a temperature of 900° C.

14. A gas turbine component comprising the composition of matter of any of the embodiments 1-13.
15. A cast and wrought piece comprising the composition of matter of any of the embodiments 1-14.
16. A powder material for additive manufacturing comprising the composition of matter of any of the embodiments 1-14.
17. The present disclosure further describes a method of fabricating a composition of matter, comprising:
melting Co, Ni, Al, Ta, and Cr together so as to form an alloy;
further forming the alloy so as to form a formed alloy;
heat treating the formed alloy so as to obtain a heat treated alloy;
performing an ageing treatment of the heat treated alloy so as to obtain an aged alloy, wherein:
the aged alloy comprises a solid solution of gamma (Al, face centered cubic) and gamma prime ($L1_2$ intermetallic) alloy phases,
the Ni content is at least 25% at. %,
the Al content is at least 10 at. %,
the Cr content is at least 2 at. %,
the Ni:Co ratio is between 0.5 and 1.5.
18. The method of embodiment 17, wherein the Ni content is in a range of 25 at. % to 40 at. %, the Al content is in a range of 10 at. % to 16 at. %, the Cr content is in a range of 2 at. % to 8 at. %, the Ta content is in a range of 2-5 at. %, and further comprising a W content in a range of 0 to 5 at. %, and wherein the Ni:Co ratio is between 0.5 and 1.5.
19. The method of embodiment 17, wherein the forming forms the alloy into a powder.
20. The method of embodiment 19, further comprising processing the powder using powder metallurgy so as to obtain a part.
21. The method of embodiment 20, wherein the processing comprises additive manufacturing.
22. The method of embodiment 17, wherein the forming comprises casting the alloy so as to form a cast alloy.
23. The method of embodiment 22, further comprising working the cast alloy so as to form a cast and wrought piece.
24. The method of embodiment 17, wherein the forming comprises solidifying the alloy into an ingot.
25. The method of embodiment 24, wherein the forming further comprises forging the ingot, extruding the ingot, or rolling the ingot.
26. The method of embodiment 17, wherein the forming comprises growing the alloy so as to obtain a single crystal.
27. The composition of matter of any of the embodiments 1-16 manufactured using the method of any of the embodiments 17-26.

Advantages and Improvements

Unprecedented advances in computational capabilities, advanced characterization techniques and the ability to generate and harness large-scale data enable new pathways for the design and synthesis of a broad array of advanced materials systems. However, prior to the present invention, critical gaps existed in the infrastructure for multiphase, multicomponent metallic materials, where the design space is extraordinary large and synthesis processes are complex and expensive. These issues have been addressed in the present discovery by a combination of high-throughput combinatorial synthesis techniques in a multicomponent space [7] coupled with a rapid screening technique [8] to identify the more promising compositions out of the many alloy candidates generated. While high-throughput combinatorial synthesis approaches have been undertaken in the past [22, 23], the present work is novel in its use of higher-order composition space (6 elements), which allows systematic investigation of alloys that have great enough complexity to actually achieve desirable properties relative to commercial alloys. The alloy samples used in the present work were also synthesized to be relatively thick (~100 µm) [7], such that oxidation testing could be conducted at temperatures relevant to commercial needs (nominally 1100° C.). Furthermore first principles calculations guided the selection of higher order alloying elements [2], enabling a new compositional domain to be discovered via a combination of combinatorial, high throughput and computational approaches.

The thermodynamic coexistence of the γ-Co solid-solution phase with fcc structure and the crystallographically related γ'-$Co_3$(Al,W) phase, and the similarity of their lattice parameters permit establishment of a two-phase structure with a high degree of coherency. This structure is morphologically identical to the microstructure of Ni-base superalloys and potentially promises much higher temperature capabilities, due to its high melting point (solidus temperature). However, given that the design space for this new class of materials only exists in ternary and higher order dimensions, the challenge is to integrate emerging and existing experimental and computational tools to efficiently identify new materials with favorable properties within this very large compositional domain. Since these materials are being synthesized with an initial melting step, a particular challenge lies in the prediction of the behavior of the multicomponent alloys starting from crystallization from the liquid through the transformations that establish the two phase microstructure. Surprisingly and unexpectedly, the present invention has addressed critical gaps by discovering favorable two phase compositions highly amenable to multiple processing paths. Favorable single crystal growth behavior can be predicted by segregation behavior of elements during solidification [4] and was validated by the growth of single crystals within the DMREF-Co composition space that were free of grain defects such as freckles and stray grains. Suitability for additive manufacturing approaches has been assessed with the use of electron beam melting tracks. Wrought processing approaches are enabled by the presence of a wide temperature range between the solvus and solidus. Specifically, the present invention has identified the first $L1_2$-strengthened Co-base alloy that simultaneously possesses a high solvus temperature, a high fraction of the strengthening $L1_2$ phase, good oxidation resistance and favorable processing behavior.

REFERENCES

The following references are incorporated by reference herein.
[1] Kawagishi et al., Development of an Oxidation-Resistant High-Strength Sixth Generation Single-Crystal Superalloy TMS-238. *Superalloys* 2012 189-195 (2012).
[2] Mottura, A., Janotti, A. & Pollock, T. M. Alloying Effects in the γ' Phase of Co-based Superalloys. *Superalloys* 2012 685-693 (2012).
[3] Rhein et. al., Creep Behavior of Quinary γ'-Strengthened Co-Based Superalloys, *Metallurgical and Materials Transactions A*, 4090—VOLUME 49A, SEPTEMBER 2018.

[4] M. Tsunekane, A. Suzuki and T. M. Pollock, "Single Crystal Solidification of New Co—Al—W-base Alloys", *J Intermetallics* 19. 636-643, (2011).

[5] Chauvet et. al., Hot cracking mechanism affecting a non-weldable Ni-based superalloy produced by selective electron Beam Melting, Acta Materialia 142 (2018) 82-94.

[6] David et. al, Welding of nickel base superalloy single crystals, *Science and Technology of Welding and Joining* 1997 Vol. 2 No. 2

[7] Stewart, C. A., Rhein, R. K., Suzuki, A., Pollock, T. M. & Levi, C. G. Oxide Scale Formation in Novel γ-γ' Cobalt-Based Alloys. in *Proceedings of the 13th International Symposium on Superalloys* (eds. Hardy, M. et al.) 991-999, TMS (The Minerals, Metals & Materials Society), 2016).

[8] Stewart, C. A., Suzuki, A., Pollock, T. M. & Levi, C. G. Rapid Assessment of Oxidation Behavior in Co-Based γ/γ' Alloys. *Oxid Met* 90, 485-498, (2018).

[9] Tolpygo, V. K., & Clarke, D. R. Microstructural study of the theta-alpha transformation in alumina scales formed on nickel-aluminides. *Mater. High Temp.* 17, 59-70 (2000)

[10] Sato, J. et al. Cobalt-Base High-Temperature Alloy. *Science* 312, 90-91 (2006)

[11] Yan, H. Y., Vorontsov, V. A. & Dye, D. Effect of alloying on the oxidation behavior of Co—Al—W superalloys. *Corros. Sci.* 83, 382-395 (2014).

[12] Titus, M. S. Suzuki, A. & Pollock, T. M. High Temperature Creep of New L1$_2$-containing Cobalt-base Superalloy. *Superalloys* 2012 823-832 (2012).

[13] Shinagawa, K. et al. Phase Equilibria and Microstructure on γ' Phase in Co—Ni—Al—W System. *Materials Transactions* 49, 1474-1479 (2008).

[14] R. R. Adharapurapu, J. Zhu, V. S. Dheeradhada, D. M. Lipkin and T. M. Pollock, "A Combinatorial Investigation of Palladium and Platinum Additions to β-NiAl Overlay Coatings", *Acta Materialia* 77, 379-393, (2014

[15] T. M. Pollock, D. M. Lipkin and K. J. Hemker, "Multifunctional Coating Interlayers for Thermal Barrier Systems", *MRS Bulletin* 37, 923-931, (2012).

[16] Shinagawa, K. et al. Ductility Enhancement by Boron Addition in Co—Al—W High-Temperature Alloys. *Scripta Materialia* 61, 612-615 (2009).

[17] Wang, L. et al. Effect of Minor Carbon Additions on the High-Temperature Creep Behavior of a Single-Crystal Nickel-Based Superalloy. *Materials Characterization* 104, 81-85 (2015).

[18] Klein, L., Shen, Y., Killian, M. S. & Virtanen, S. Effect of B and Cr on the High Temperature Oxidation Behaviour of Novel γ/γ'-Strengthened Co-Base Superalloys. *Corros. Sci.* 53, 2713-2720 (2011).

[19] Naumenko, D., Pint, B. A., Quadakkers, W. J. Current Thoughts on Reactive Element Effects in Alumina-Forming Systems: In Memory of John Stringer. *Oxid. Met.* 86, 1-43 (2016).

[20] Pint, B. A., More, K. L. & Wright, I. G. The Use of Two Reactive Elements to Optimize Oxidation Performance of Alumina-Forming Alloys. *Materials at High Temperatures* 20, 375-386 (2003).

[21] Pint, B. A., Optimization of Reactive-Element Additions to Improve Oxidation Performance of Alumina-Forming Alloys. *J. Am. Ceram. Soc.* 86, 686-695 (2003).

[22] Metting, C. J., et al. Combinatorial Approach to Turbine Bond Coat Discovery. *ACS Comb. Sci.*, 15, 419-424 (2013).

[23] Naujoks, D., et al. Phase Formation and Oxidation Behavior at 500° C. in a Ni—Co—Al Thin-Film Materials Library. *ACS Comb. Sci.*, 18, 575-582 (2016).

[24] US2017/0342527 A1, "Cobalt-Based Superalloy", Friedrich-Alexander-Universität Erlangen-Nürnberg (2017 Nov. 30)

[25] U.S. Pat. Nos. 5,270,123A, 5,455,120A, "Nickel-base superalloy and article with high temperature strength and improved stability", General Electric Co (1992 Mar. 5)

[26] U.S. Pat. No. 5,916,382A, "High corrosion resistant high strength superalloy and gas turbine utilizing the alloy", Hitachi Ltd, Hitachi Metals Ltd (1992 Mar. 9)

[27] U.S. Pat. No. 5,395,584A, "Nickel-base superalloy compositions", Avco Corp (1992 Jun. 17)

[28] U.S. Pat. No. 4,388,124A, "Cyclic oxidation-hot corrosion resistant nickel-base superalloys", General Electric Co (1979 Apr. 27)

[29] U.S. Pat. No. 5,366,695A, "Single crystal nickel-based superalloy", Cannon-Muskegon Corp (1992 Jun. 29)

[30] U.S. Pat. No. 3,667,939A, "High temperature cobalt-base sheet alloy", United Technologies Corp (1971 Dec. 30)

[31] U.S. Pat. No. 4,437,913A, "Cobalt base alloy", Hitachi Ltd (1978 Dec. 4)

[32] U.S. Pat. No. 4,789,412A, "Cobalt-base alloy having high strength and high toughness, production process of the same, and gas turbine nozzle", Hitachi Ltd (1986 Mar. 20)

[33] U.S. Pat. No. 4,078,922A, "Oxidation resistant cobalt base alloy", United Technologies Corp (1975 Dec. 8)

[34] U.S. Pat. No. 4,668,265A, "Corrosion resistant cobalt-base alloy and method of making fibers", Owens Corning (1985 Jun. 18).

[35] U.S. Pat. No. 9,543,274 "Cobalt-base alloy with high heat resistance and high strength and process for producing the same," Ishida et. al.

[36] U.S. Pat. No. 8,551,265 "Cobalt-base alloy with high heat resistance and high strength and process for producing the same," Ishida et. al.

[37] U.S. Pat. No. 9,034,247, "Alumina-forming cobalt-nickel base alloy and method of making an article therefrom"

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A composition of matter, comprising:
an alloy of Co, Ni, Al, Ta, and Cr, wherein:
the alloy comprises a solid solution of gamma and gamma prime alloy phases,
the Ni content is at least 25% at. %,
the Al content is at least 10 at. %,
the Cr content is at least 2 at. %,
the Ni:Co ratio is between 0.5 and 1.5, and
further comprising:

a W content in a range of 0 to 2 at. %, and
the Ta content in a range of 2.5-5 at. %, wherein:
the alloy is able to generate a protective aluminum oxide layer upon exposure to air, and
the alloy is characterized by having a γ' solvus greater than 1100° C. and a solidus of 1343° C. or less.

2. The composition of matter of claim 1, wherein:
the Ni content is in a range of 25 at. % to 40 at. %,
the Al content is in a range of 12 at. % to 16 at. %, and
the Cr content is in a range of 2 at. % to 8 at. %, and
the Ta content is in a range of 3-5 at. %.

3. The composition of matter of claim 2, wherein the alloy further comprises at least one of C, B, Y or Hf.

4. The composition of matter of claim 3, wherein:
the B content is in a range of 0.01 to 0.1 at. %,
the Y content is in a range of 0.001 to 0.004, and
the Hf content is in a range of 0.02 to 0.08 at. %.

5. The composition of matter of claim 3, wherein:
the Ni content is in a range of 36-38 at. %,
the Al content is in a range of 12-14 at. %,
the Cr content is in a range of 5-7 at. %,
the Ta content is in a range of 3-5 at. %,
the W content is in a range of 0.5-2 at. %,
the B content is in a range of 0.01-0.1 at. %,
the Y content is in a range of 0.001-0.004 at. %,
the Hf content is in a range of 0.02-0.08 at. %, and
the Co content is the remainder.

6. The composition of matter of claim 2, wherein the alloy further comprises at least one of C, B, or a reactive element metal.

7. The composition of matter of claim 2, wherein the alloy further comprises carbon (C).

8. The composition of matter of claim 1, wherein
the Co content is in a range of 38-40 at. %,
the Ni content is in a range of 37-39 at. %,
the Al content is in a range of 12-14 at. %,
the Cr content is in a range of 5-7 at. %,
the Ta content is in a range of 3-4 at. %, and
the W content is in a range of 0.5-2 at. %.

9. The composition of matter of claim 8, wherein the alloy maintains its strengthening precipitates above a temperature of 1190° C. and is able to generate the protective aluminum oxide layer upon exposure to the air at 1100° C.

10. The composition of matter of claim 8, wherein the alloy maintains a creep rupture strength of 248 MPa at 982° C. and 310 MPa at a temperature of 900° C.

11. A powder material for additive manufacturing comprising the composition of matter of claim 8, and wherein the alloy has increased crack resistance under melting conditions used during the additive manufacturing, as compared to a nickel based superalloy PWA 1480.

12. The composition of matter of claim 1, further comprising at least one of Ti and Nb, wherein the Ti or Nb content is up to 4 at. %.

13. A gas turbine component comprising the composition of matter of claim 1.

14. A cast and wrought piece comprising the composition of matter of claim 1 wherein
the Ni content is in a range of 25 at. % to 40 at. %,
the Al content is in a range of 10 at. % to 16 at. %,
the Cr content is in a range of 2 at. % to 8 at. %, and
the Ta content is in a range of 3-5 at. %.

15. A 3D printed alloy or a powder for additive manufacturing consisting of the composition of matter of claim 1.

16. The composition of matter of claim 1, wherein the alloy is characterized by having 98° C.≤(solidus—γ' solvus) ≤143° C. and a time to rupture of at least 1 hour under a stress of 248 MPa at 982° C. and the stress of 310 MPa at a temperature of 900° C., as measured using a Larson Miller analysis.

17. A method of fabricating a composition of matter, comprising:
melting Co, Ni, Al, Ta, and Cr together so as to form an alloy;
further forming the alloy so as to form a formed alloy;
heat treating the formed alloy so as to obtain a heat treated alloy;
performing an ageing treatment of the heat treated alloy so as to obtain an aged alloy, wherein:
the aged alloy comprises a solid solution of gamma and gamma prime alloy phases,
the Ni content is at least 25% at. %,
the Al content is at least 10 at. %,
the Cr content is at least 2 at. %, and
the Ni:Co ratio is between 0.5 and 1.5,
further comprising a W content in a range of 0 to 2 at. % and the Ta content in a range of 2.5-5 at. %, wherein:
the alloy is able to generate a protective aluminum oxide layer upon exposure to air, and
the alloy is characterized by having a γ' solvus greater than 1100° C. and a solidus of 1343° C. or less.

18. The method of claim 17, wherein:
the Ni content is in a range of 25 at. % to 40 at. %,
the Al content is in a range of 10 at. % to 16 at. %,
the Cr content is in a range of 2 at. % to 8 at. %, and
the Ta content is in a range of 3-5 at. %.

19. The method of claim 17, wherein the forming forms the alloy into a powder.

20. The method of claim 19, further comprising processing the powder using powder metallurgy so as to obtain a part.

21. The method of claim 20, wherein the processing comprises additive manufacturing.

22. The method of claim 17, wherein the forming comprises casting the alloy so as to form a casted alloy.

23. The method of claim 22, further comprising working the casted alloy so as to form a cast and wrought piece.

24. The method of claim 23, wherein the forming comprises solidifying the alloy into an ingot.

25. The method of claim 24, wherein the forming further comprises forging the ingot, extruding the ingot, or rolling the ingot.

26. The method of claim 17, wherein the forming comprises growing the alloy so as to obtain a single crystal.

27. A composition of matter, comprising:
an alloy of Co, Ni, Al, Ta, and Cr, wherein:
the alloy comprises a solid solution of gamma and gamma prime alloy phases,
36 at. %≤Ni content≤38 at. %,
12 at. %≤Al content≤14 at. %,
5 at. %≤Cr content≤7 at. %,
3 at. %≤Ta content≤5 at. %,
0.5 at. %≤W content≤2 at. %;
the alloy further comprises at least one of C, B, Y or Hf,
the Co comprises the remainder, and
the alloy is characterized by having a γ' solvus greater than 1100° C. and a solidus of 1343° C. or less.

28. A powder material for additive manufacturing comprising the composition of matter of claim 27.

29. The composition of matter of claim 27, wherein the alloy comprises the C, B, and Hf.

30. The composition of matter of claim 27, wherein the alloy comprises the C and Hf.

31. The composition of matter of claim 27, wherein the alloy comprises the C, B, Hf, and Y.

* * * * *